Oct. 13, 1925.
R. CHILTON
1,557,022
VALVE AND METHOD OF MAKING SAME
Filed Nov. 3, 1922
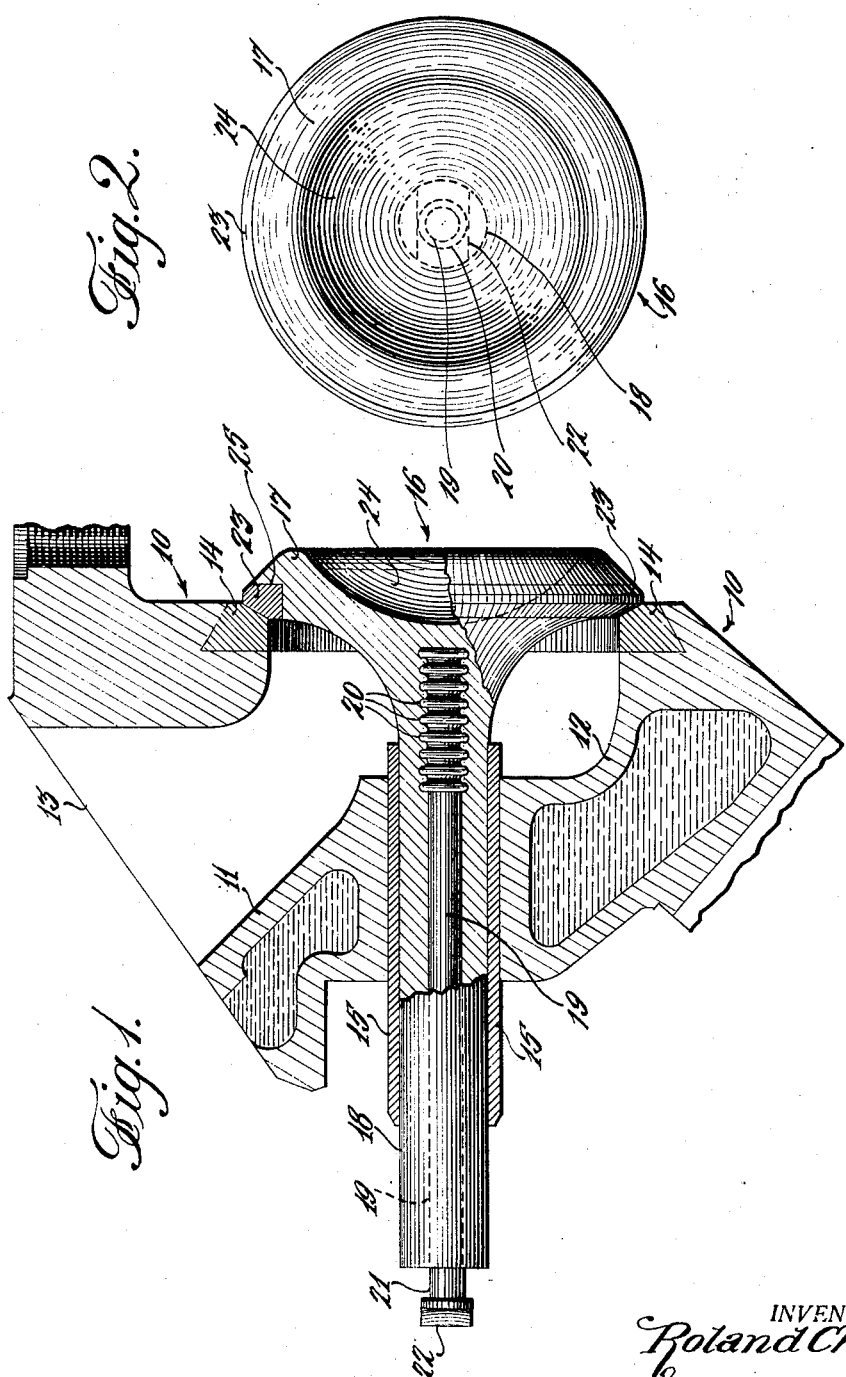
INVENTOR
Roland Chilton
BY
Werner F. Rothermund
ATTORNEY Patented Oct. 13, 1925.

1,557,022

UNITED STATES PATENT OFFICE.

ROLAND CHILTON, OF KEYPORT, NEW JERSEY, ASSIGNOR TO AEROMARINE PLANE & MOTOR COMPANY, A CORPORATION OF NEW YORK.

VALVE AND METHOD OF MAKING SAME.

Application filed November 3, 1922. Serial No. 598,872.

*To all whom it may concern:*

Be it known that I, ROLAND CHILTON, a subject of the King of England, and resident of Keyport, in the county of Monmouth and State of New Jersey, have invented certain new and useful Improvements in Valves and Methods of Making Same, of which the following is a specification, reference being had to the accompanying drawings, forming part of this specification.

This invention relates to improvements in valves and method of making same, especially to those which are used in situations subject to great heat. The exhaust valve of an internal combustion engine is an example and such a valve is featured in the drawings of this specification. The object of this invention is to provide a valve which will operate without excessive rise in temperature even though the fluids which the valve controls may be at relatively great temperature. This end may be attained by constructing a valve of greatly improved thermal conductivity from the head of the valve to the stem, and this increased thermal conductivity is attained primarily by utilizing a material of high thermal conductivity for the construction of the valve. The available materials having this desired high conductivity are numerous and generally well known in the art, special aluminum alloys have been developed having this characteristic and which are commercially available, these however possess a relatively small degree of strength which has prevented their successful use for this purpose in the past. In this invention, however, special means are contemplated for reenforcing relatively weak but highly conductive material whereby its use is rendered practical.

Further, the available materials characterized by high thermal conductivity are relatively soft and unsuited for the material forming the contact face of the valve on its seat, and accordingly one of the features of this invention is a valve contact face of wear-resisting material rigidly attached to a valve body of highly conductive material in such a manner as to insure good thermal contact between the two.

It will be appreciated that the temperature obtained by the head of the valve in relation to the temperature of the gases passing depends upon the rate at which heat can be abstracted from the valve head. This is a direct function of the area, and the conductivity of the valve stem and an inverse function of the length thereof. For the efficient functioning of the structure herein featured adequate heat absorbing provision must be made at the valve stem guide, as for instance by adequate water circulation around that member as indicated on the drawings of the showing.

The vulnerability of exhaust valves of internal combustion engines to burning or oxidization arises principally from the fact that while these valves receive heat from the extremely hot exhaust gases passing at relatively high velocity, yet in conventional designs very little of this heat is conducted down the stem to the water jacketed valve stem guide. This invention on the contrary aims at securing a very substantial and useful transfer of heat from the valve head to the water cooled valve guide by means of the special material and construction of the valve stem.

Various other objects and advantages of my invention are illustrated in the accompanying drawings and more fully set forth in the following description of one form of mechanism embodying my invention, the features of novelty being pointed out particularly in the claims at the end of the specification.

In the drawings:—

Figure 1 is a longitudinal view partly in section of an exhaust valve embodying my invention; fragments of associated cylinder head parts are shown in section.

Figure 2 is a head end view of the valve shown in Fig. 1.

In the present instance 10 denotes the cylinder head of an internal combustion engine, 11 and 12 the water jackets, 13 the exhaust port, 14 the valve seat, 15 the valve stem guide. The valve 16, having a body 17, and a stem 18 is slidable in the valve stem guide 15 and operated in any suitable manner. Within the valve stem 18 and coaxially disposed therewith is a cylindrical core 19 having an exteriorly extending portion 21 with an integral head portion 22. Upon the end of the valve core 19 and within the valve body 17 and its stem 18, I have formed a series of annular ribbed portions or serrations 20 integral with said valve core. In a recessed portion upon the valve head 17 I have secured an annular valve seat contact member 23 adapted to bear against the valve seat 14; a shoulder 25 is provided to prevent axial movement of the member 23 upon the head 17. The valve body 17 has a dished or concave portion 24.

The method of construction of the above enumerated parts is as follows; the valve core 19 as described above being formed preferably of a ferrous metal of high tensile strength. The valve 16 with its body 17 and the stem 18 is formed of any metallic composition having high thermal conductivity but preferably an aluminum alloy and is cast around the valve core 19, the serrations 20 of which, assist in holding the same in a fixed relation therewith, the core 19 thus reinforcing and materially strengthening the stem 18. The valve seat contact member 23 is also constructed preferably of ferrous metal high in tensile strength and is shrunk upon the valve body 17 in a manner well known to those skilled in the art. The function of the elements as described, is as follows; the extremely hot exhaust gases generated in the combustion chamber (not shown) pass out through the port 13 as the valve 16 is opened, the valve is consequently subjected to great heat as these gases or fluids are intermittently expelled from the combustion chamber in rapid succession, this heat as explained hereintofore often causes serious injury to the valves of the prior art. In the present instance the valve body 17 and its stem 18 being formed of highly thermally conductive material, the heat received by the body 17 is rapidly conducted to the stem 18, which is cooled by the water jacketed valve stem guide 15. The formation of the body 17 with reference to the concave portion 24 also assists in the rapid conduction of heat to the stem 18, inasmuch as the source of heat being nearer to the stem, due to the concavity, the heat is rapidly conducted to the stem 18 which is effectively cooled in the above described manner.

While I have shown and described and have pointed out in the annexed claims certain novel features of my invention, it will be understoood that various omissions, substitutions and changes in form and details of the device illustrated and in its operation may be made by those skilled in the art without departing from the spirit of the invention.

Having thus described my invention, I claim:—

1. In a valve, the combination of an inner core of high tensile material having serrations thereon, and outer body portion of highly thermally conductive material secured to the inner core by said serrations, and a peripheral portion of high tensile material on said body portion.

2. In a valve, the combination of an inner core of high tensile material in fixed relation with an outer body portion of highly thermally conductive material and an annular peripheral portion of high tensile material in fixed relation with said body portion.

3. In a valve, the combination of an outer thermally conductive element reinforced by an inner element of high tensile strength and a seat contact portion of high tensile strength.

4. The method of fabricating a valve which consists of casting a material highly conductive of heat about a core of relatively strong material in a manner so as to form a body and stem portion thereabout and subsequently securing to said body portion a seat of wear resisting material.

5. In a valve, the combination of a solid head and an integral tubular stem portion formed entirely of material having relatively high thermal conductivity, a cylindrical portion of relatively high tensile strength secured in said tubular stem portion and an annular portion composed of wear resisting material secured to said head.

6. In a device of the class described, the combination with an internal combustion engine provided with a water-cooled valve guide, of a valve comprising a solid head portion and an integral stem portion composed of relatively soft heat conducting material, a reenforcing element within the stem, said stem portion in direct contact with the water-cooled guide, and a seat of relatively hard material formed on said head portion.

Signed at Keyport in the county of Monmouth and State of New Jersey this 1st day of November, A. D. 1922.

ROLAND CHILTON.